(12) United States Patent
Kovacs

(10) Patent No.: US 9,266,464 B1
(45) Date of Patent: Feb. 23, 2016

(54) VEHICLE PASSENGER SIDE SAFETY LAMP SYSTEMS

(71) Applicant: Matthew Kovacs, Elgin, IL (US)

(72) Inventor: Matthew Kovacs, Elgin, IL (US)

( * ) Notice: Subject to any disclaimer, the term of this patent is extended or adjusted under 35 U.S.C. 154(b) by 0 days.

(21) Appl. No.: 13/743,533

(22) Filed: Jan. 17, 2013

Related U.S. Application Data

(60) Provisional application No. 61/588,413, filed on Jan. 19, 2012.

(51) Int. Cl.
*B60Q 1/26* (2006.01)
*B60Q 1/00* (2006.01)
*H05B 37/02* (2006.01)
*B60Q 1/32* (2006.01)

(52) U.S. Cl.
CPC ............... *B60Q 1/0029* (2013.01); *B60Q 1/32* (2013.01); *H05B 37/02* (2013.01)

(58) Field of Classification Search
CPC .. B60Q 1/2611; B60Q 1/2657; B60Q 1/2669; B60Q 1/326; B60Q 1/0029; B60Q 1/32; H05B 37/02
USPC ................................................. 362/464, 487
See application file for complete search history.

(56) References Cited

U.S. PATENT DOCUMENTS

| | | | |
|---|---|---|---|
| 5,467,071 A | 11/1995 | Koenig | |
| 6,572,250 B1 | 6/2003 | Assinder et al. | |
| 7,175,320 B1 | 2/2007 | Burgess | |
| 8,075,169 B2 * | 12/2011 | Englander | 362/478 |
| 8,698,610 B2 * | 4/2014 | Krugh, IV | 340/433 |
| 2003/0099111 A1 * | 5/2003 | Shih | 362/494 |
| 2012/0074841 A1 * | 3/2012 | Liu et al. | 315/77 |

* cited by examiner

*Primary Examiner* — Stephen F Husar
(74) *Attorney, Agent, or Firm* — RG Patent Consulting, LLC; Rachel Gilboy

(57) ABSTRACT

A vehicle passenger side safety lamp system is a light with control circuitry mounted to the passenger side of a bus or tractor trailer rig to illuminate the right rear tire area beside the vehicle to increase driver visibility and thereby promote public road safety. The light assembly is crescent shaped and is wired to the right turn signal circuit to light automatically with the turn signal, and may be wired to illuminate automatically when a greater than 40 degree right turn is made. The light assembly becomes lighted when a reverse gear is entered.

2 Claims, 5 Drawing Sheets

VEHICLE PASSENGER SIDE SAFETY LAMP SYSTEMS

CROSS-REFERENCE TO RELATED APPLICATION

The present application is related to and claims priority from prior provisional application Ser. No. 61/588,413, filed Jan. 19, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of lights and more specifically relates to a vehicle passenger side safety lamp system.

2. Description of the Related Art

One of the more important factors which consumers consider when purchasing a vehicle is safety. To appeal to the consumer's desire for a safer automobile, manufacturers are equipping cars with new and innovative safety equipment each year. One potential hazard which has not been adequately addressed by auto manufacturers is the area surrounding the automobile in which the driver's view may be obstructed or inadequate due to the length of the vehicle. The areas along the sides of the automobile which are difficult to see from the driver's perspective are some of the more common problem areas. Because of these limitations, the driver is often in danger of causing an automobile accident. In situations such as changing lanes or pulling away from a curbside, turning around a curve, rear view or side view mirrors on an automobile are generally utilized. Unfortunately, these mirrors are adequate for giving only a limited view of the surrounding area, especially in low light or dark conditions. It is desirable that safety in driving is maximized such that pedestrians and property are suitably illuminated for the driver to avoid accident and injury.

The above-mentioned problem may be exacerbated when operating large vehicles; primarily, school buses and tractor-trailers, where the right side of these huge machines is difficult to fully see. School buses pose particular concern since these vehicles carry multitudes of children who walk alongside the bus when boarding. As such, many additional precautions must be taken by bus drivers; unfortunately, this can prove quite difficult because of the lack of full visibility discussed above. The hindrance is even worse when it is dark, since millions of school children are picked up before the sun rises and some are not dropped at home until after dark during the shortened days of winter months. Further pedestrians tend to stand close to the edge of the sidewalk while waiting to cross at a crosswalk. A solution to increase driver visibility and awareness is desirable.

Various attempts have been made to solve the above-mentioned problems such as those found in U.S. Pat. Nos. 7,175,320; 5,467,071; and 6,572,250. This prior art is representative of lighting devices. None of the above inventions and patents, taken either singly or in combination, is seen to describe the invention as claimed.

Ideally, a vehicle lighting device should provide an increase in driver visibility around a vehicle, and, yet, would operate reliably and be manufactured at a modest expense. Thus, a need exists for a reliable vehicle passenger side safety lamp system to illuminate the right rear tire area of school buses and other large vehicles such as tractor-trailers thereby increasing the visibility, helping to prevent injury to persons as well as damage to vehicles, and to avoid the above-mentioned problems.

BRIEF SUMMARY OF THE INVENTION

In view of the foregoing disadvantages inherent in the known lighting art, the present invention provides a novel vehicle passenger side safety lamp system. The general purpose of the present invention, which will be described subsequently in greater detail, is to provide illumination of the right rear tire area of school buses and other large vehicles such as tractor-trailers thereby increasing the visibility and helping to prevent injury to persons on the ground and damage to vehicles.

A vehicle passenger side safety lamp system is disclosed herein and in a preferred embodiment may comprise a light assembly having a light housing, a mounting flange, at least one light bulb, at least one conductor wire, a bulb cover, and a control circuit. The light housing is non-removably attached to the mounting flange and the mounting flange is removably attached to a passenger exterior side of a vehicle. At least one light bulb is removably coupled to at least one light socket within the light housing. The light assembly may use 12 volts direct current on some vehicles and may use 24 volts in other embodiments. The light housing is preferably crescent or half-moon shaped and about 4 inches in length and about 4 inches in width. The housing angle may be rotationally and vertically adjustable, the adjusted angle locked into place by at least one detent.

The at least one conductor wire is removably attached to the light bulb and the right-turn control circuit such that the light bulb is automatically lighted when the right-turn control circuit is lighted. The at least one light bulb of the light assembly may also be automatically illuminated when a driver-user activates a right turn signal or when a right-turn of the vehicle that is greater than 40 degrees is made by the driver-user traveling in a forward direction. The at least one light bulb of the light assembly is also able to be automatically illuminated when the vehicle is placed in a reverse gear. The vehicle may be a school bus. The at least one light bulb of the light assembly may also be illuminated when the driver-user manually activates a switch in certain embodiments. The vehicle having the right-turn control circuit activated with the right-turn signal flashing steadily, the light bulb of the light assembly is activated non-intermittently. The bulb cover is attached to the housing such that the bulb cover is a protection shield for the light bulb. The at least one light bulb may be an assembly of LED lights and the light assembly may be an after-market accessory or be supplied with new vehicles by a manufacturer. The safety light as disclosed herein may be positioned wherever the manufacturer deems appropriate to gain maximum visibility. The vehicle passenger side safety lamp system is useful for automatically illuminating the passenger side of the vehicle during a right turn to provide greater visibility and increased public road safety.

The vehicle passenger side safety lamp system further may comprise a kit having a light housing with a mounting flange and a bulb cover, at least one light bulb, fasteners, and a control circuit with at least one conductor wire. Installation instructions may be included. A method of using a vehicle passenger side safety lamp system may comprise the steps of starting an engine of a vehicle, activating a switch and illuminating a right-rear side of the vehicle via a light assembly, driving the vehicle, deactivating the light assembly via the switch, activating a right-turn signal and simultaneously illuminating a light bulb of the light assembly, the light assembly turning off automatically with the automatic de-activation of the right-turn signal, and parking the vehicle.

The present invention holds significant improvements and serves as a vehicle passenger side safety lamp system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, vehicle passenger side safety lamp system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a lighting device and more particularly to a vehicle passenger side safety lamp system as used to improve the visibility of vehicle drivers and thereby increase safety.

Generally speaking, vehicle passenger side safety lamp system is a light mounted to the passenger side of a bus or tractor trailer rig to illuminate the right rear tire area beside the vehicle. The light assembly is preferably crescent shaped and is wired to the right turn signal circuit to light automatically with the turn signal, or may be wired to illuminate automatically when a greater than 40 degree right turn is made.

Figure 1:
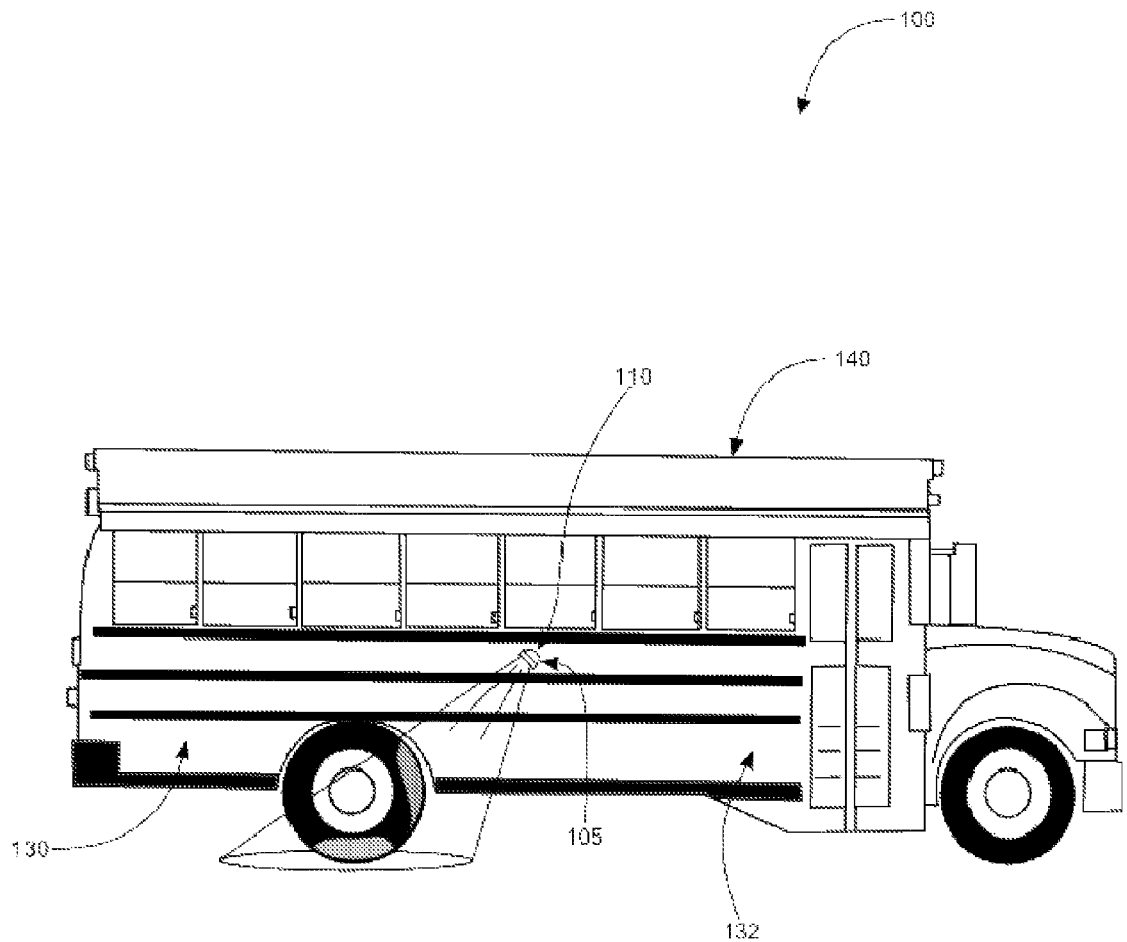
FIG. 1 shows a perspective view illustrating an in-use condition of a vehicle passenger side safety lamp system according to an embodiment of the present invention.

In greater detail now, referring to the drawings by numerals of reference there is shown in FIG. 1, a perspective view illustrating an in-use condition of vehicle passenger side safety lamp system 100 according to an embodiment of the present invention.

Light housing 110 is non-removably attached to mounting flange 120 and mounting flange 120 is removably attached to a passenger exterior right side 130 of vehicle 140. At least one conductor wire 150 is removably attached to light bulb 160 and right-turn control circuit 170 such that light bulb 160 is automatically lighted when right-turn control circuit 170 is lighted. At least one light bulb 160 of light assembly 105 may also be automatically illuminated when a driver-user activates a right turn signal 180 or when a right-turn of vehicle(s) 140 that is greater than 40 degrees is made by a driver-user traveling (in a forward direction). Optionally, at least one light bulb 160 of light assembly 105 is able to be automatically illuminated when vehicle 140 is placed in a reverse gear. Vehicle 140 may be a school bus or other such vehicle 140 with a longer length than traditional vehicle 140 lengths. Vehicle passenger side safety lamp system 100 is useful for automatically illuminating passenger side 132 of vehicle 140 during a right turn to provide greater visibility and increased public road safety.

Figure 2:
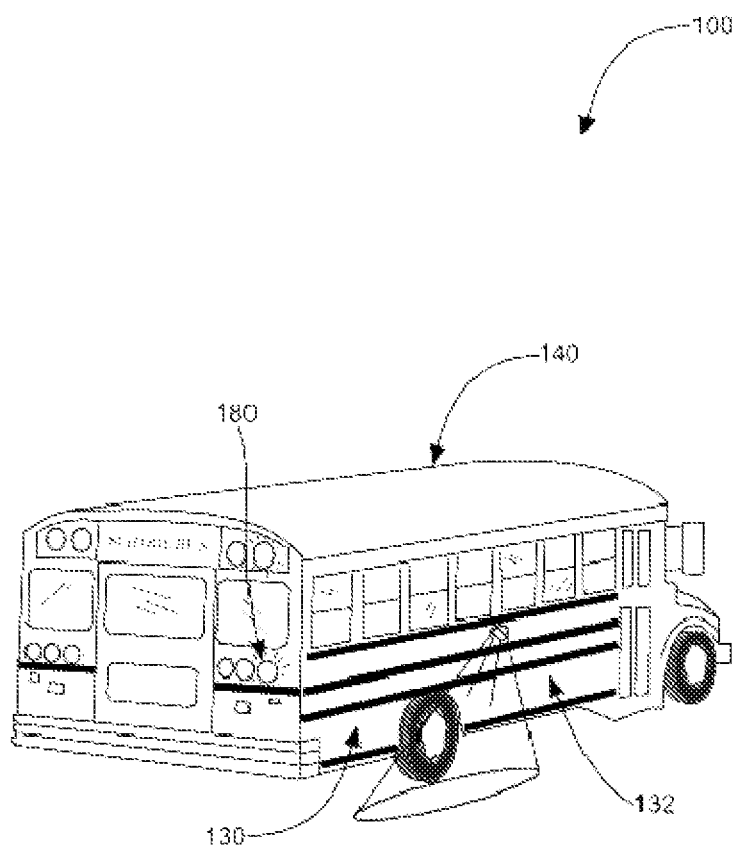
FIG. 2 is a second perspective view illustrating an in-use condition of the vehicle passenger side safety lamp system according to an embodiment of the present invention of FIG. 1.

Referring now to FIG. 2, a second perspective view illustrating an in-use condition of vehicle passenger side safety lamp system 100 according to an embodiment of the present invention of FIG. 1.

At least one light bulb 160 is removably coupled to at least one light socket 190 within light housing 110. Light assembly 105 may use 12 volts direct current in some embodiments and may use 24 volts in other embodiments. The at least one light bulb 160 of light assembly 105 may also be illuminated when the driver-user manually activates a switch in certain embodiments. Crescent shaped housing 112 is preferably low profile against the side of vehicle(s) 140 so as to not extend outward from vehicle(s) 140 far enough to be damaged unintentionally. An obstruction or a person standing on a corner will be illuminated in low light conditions to enable the driver-user to judge a correct turning radius needed to avoid contact between the moving vehicle(s) 140 and stationary objects. This also will tend to minimize 'tire scrubs' on sidewalks when making sharp corners; thus minimizing tire maintenance.

Figure 3:
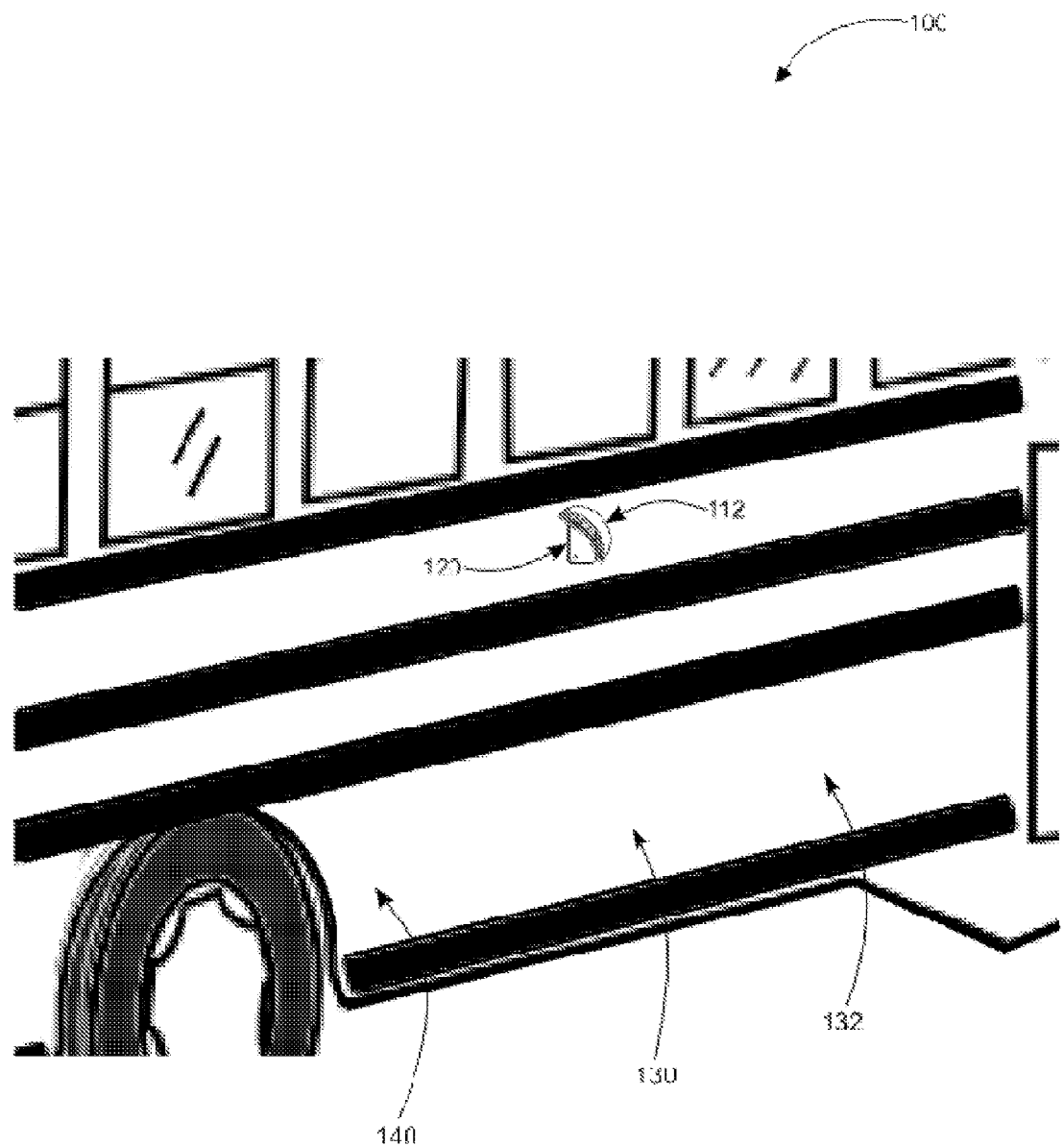
FIG. 3 is a close-up perspective view illustrating the vehicle passenger side safety lamp system according to an embodiment of the present invention of FIG. 1.

Referring now to FIG. 3, a close-up perspective view illustrating vehicle passenger side safety lamp system 100 according to an embodiment of the present invention of FIG. 1.

Light housing 110 is crescent shaped housing 112 or half-moon shaped in preferred embodiments and about 4 inches in length and about 4 inches in width. The light housing 110 angle may be rotationally and vertically adjustable, the adjusted angle locked into place by at least one detent. When vehicle(s) 140 has the right-turn control circuit activated with the right-turn signal flashing steadily, light bulb 160 of light assembly 105 is activated non-intermittently. Light bulb 160 of light assembly 105 may be wired into a circuit having a relay that provides constant battery voltage during the right turn signal operation. An additional sensor may be provided for detecting a greater than 40 degree right turn radius that will activate light bulb 160 until the turning radius again becomes less than the 40 degree activation set point. The automatic operation eliminates the need for relying on the driver-user's memory to switch light assembly 105 on.

Figure 4A:
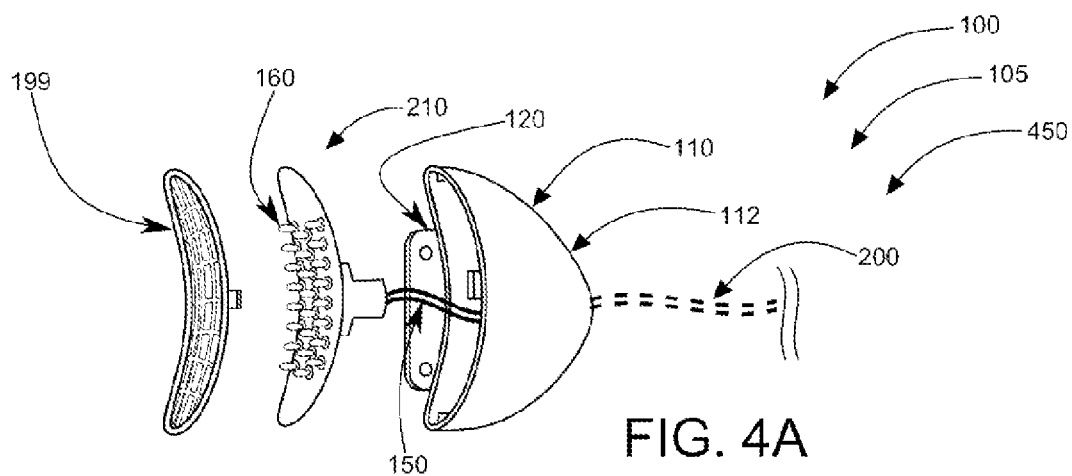
FIGS. 4A, 4B, and 4C, show a profile view and a wiring schematic illustrating the vehicle passenger side safety lamp system according to an embodiment of the present invention of FIG. 1.
Figure 4B:
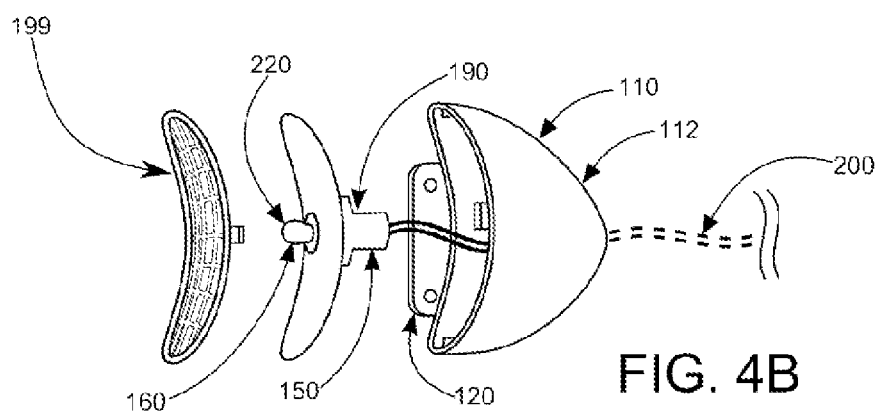
Figure 4C:
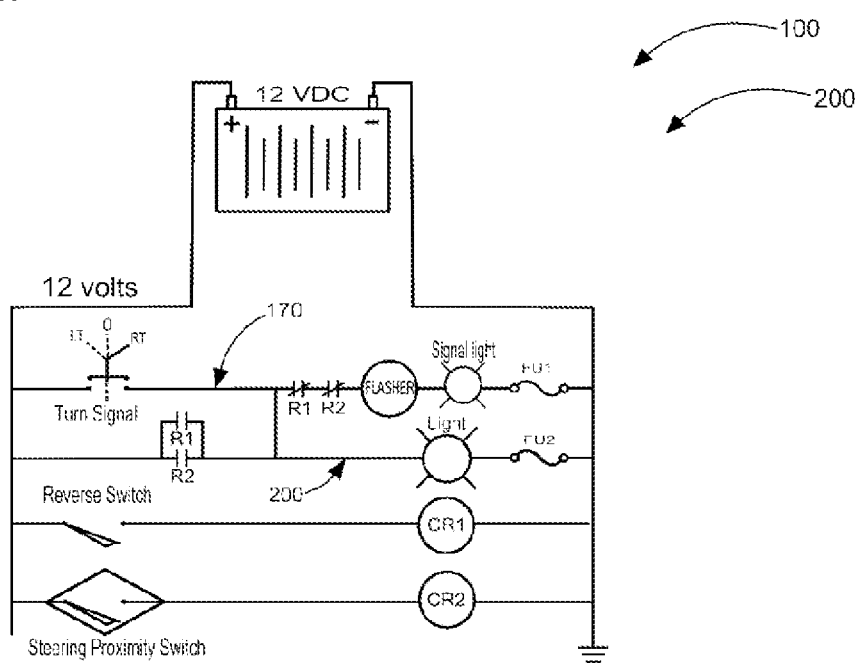

Referring now to FIGS. 4A, 4B, and 4C, showing a profile view and a wiring schematic illustrating vehicle passenger side safety lamp system 100 according to an embodiment of the present invention of FIG. 1.

Vehicle passenger side safety lamp system 100 may comprise light assembly 105 having light housing 110, mounting flange 120, at least one light bulb 160, at least one conductor wire 150, bulb cover 199, and control circuit 200. Bulb cover 199 is attached to light housing 110 such that bulb cover 199 is a protection shield for light bulb 160. The at least one light bulb 160 may be an assembly of LED lights 210 or may be single incandescent light 220. Other suitably equivalent lighting means may be used. Light assembly 105 may be an after-market accessory or be supplied with new vehicle(s) 140 OEM by a manufacturer.

Vehicle passenger side safety lamp system 100 may be sold as kit 450 comprising the following parts: at least one light housing 110 with mounting flange 120 and bulb cover 199; at least one light bulb 160; at least one fastener; at least one control circuit 200 with at least one conductor wire 150; and at least one set of installation instructions. Vehicle passenger side safety lamp system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different light combinations, parts may be sold separately, etc., may be sufficient.

Figure 5:
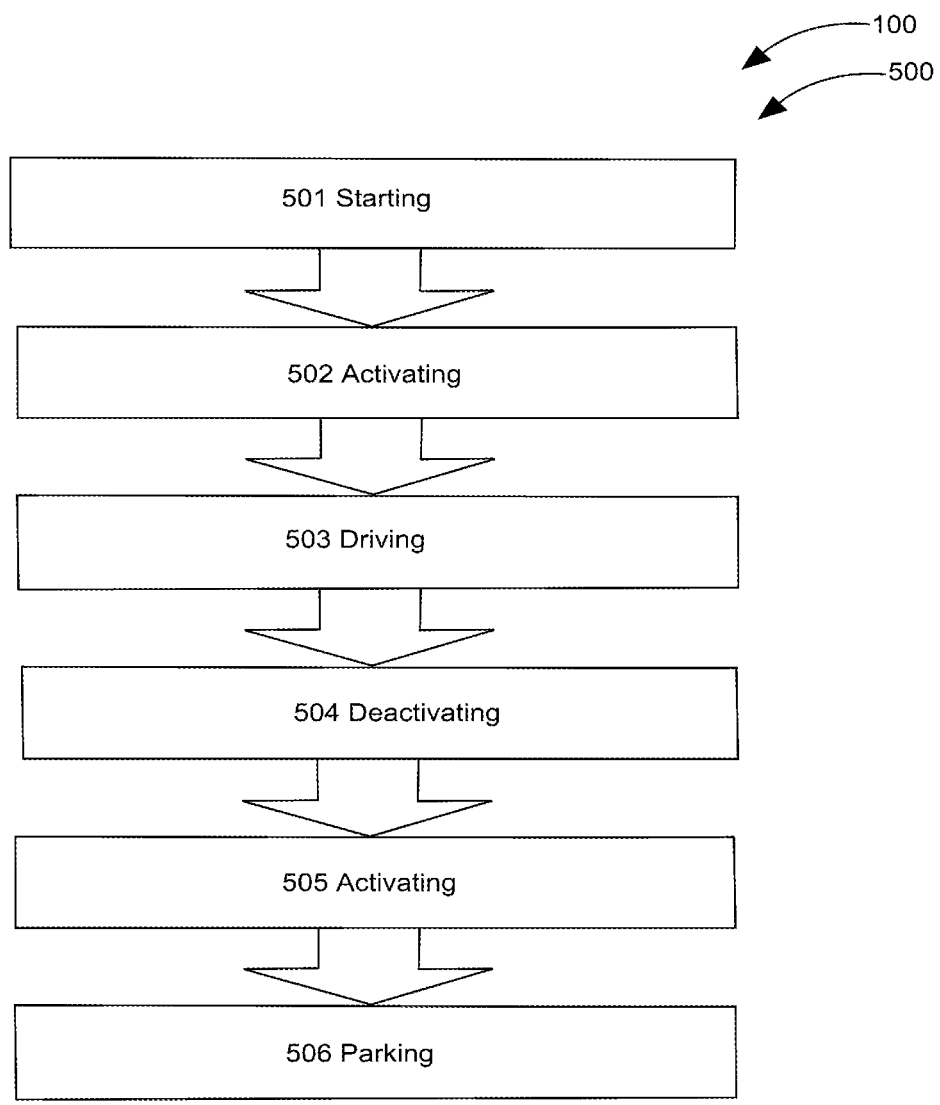
FIG. 5 is a flowchart illustrating a method of use for the vehicle passenger side safety lamp system according to an embodiment of the present invention of FIG. 1.

Referring now to FIG. 5, a flowchart illustrating method of use 500 for vehicle passenger side safety lamp system 100 according to an embodiment of the present invention of FIG. 1.

A method of use 500 for vehicle passenger side safety lamp system 100 may comprise the following steps: step one 501 starting an engine of vehicle(s) 140; step two 502 activating a switch and illuminating a right-rear side of vehicle(s) 140 via light assembly 105; step three 503 driving vehicle 140; step four 504 deactivating light assembly 105 via a switch; step five 505 activating right turn signal 180 and simultaneously illuminating light bulb 160 of light assembly 105, light assembly 105 turning off automatically with automatic de-activation of right turn signal 180; and step six 506 parking vehicle(s) 140.

It should be noted that steps 502 and 504 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:
1. A vehicle passenger side safety lamp system comprising:
   a light assembly having;
      a light housing;
      a mounting flange;
      at least one light bulb;
      at least one conductor wire;
      a bulb cover; and
      a control circuit;
   wherein said light housing is non-removably attached to said mounting flange;
   wherein said mounting flange is removably attached to a passenger exterior side of a vehicle;
   wherein said at least one light bulb is removably coupled to at least one light socket within said light housing;
   wherein said light assembly uses 12 volts direct current;
   wherein said light housing is crescent shaped;
   wherein said light housing is about 4 inches in length and about 4 inches in width;
   wherein said housing angle is rotationally and vertically adjustable, said adjusted angle locked into place by at least one detent;
   wherein said at least one conductor wire is removably attached to said light bulb and said right-turn control circuit such that said light bulb is automatically lighted when said right-turn control circuit is lighted;
   wherein said at least one light bulb of said light assembly is automatically illuminated when a driver-user activates a right turn signal;
   wherein said at least one light bulb of said light assembly is automatically illuminated when a right-turn of a vehicle that is greater than 40 degrees is made by said driver-user traveling in a forward direction;
   wherein said vehicle is a school bus;
   wherein said at least one light bulb of said light assembly is automatically illuminated when said vehicle is placed in a reverse gear;
   wherein said vehicle having said right-turn control circuit activated with said right-turn signal flashing steadily, said light bulb of said light assembly is activated non-intermittently;
   wherein said bulb cover is attached to said housing such that said bulb cover is a protection shield for said light bulb;
   wherein said at least one light bulb is an assembly of LED lights;
   wherein said light assembly is an after-market accessory; and
   wherein said vehicle passenger side safety lamp system is useful for automatically illuminating said passenger side of said vehicle during a right turn to provide greater visibility and increased safety.

2. The vehicle passenger side safety lamp system of claim 1 further comprising a kit having:
- said light housing with said mounting flange and said bulb cover;
- at least one said light bulb;
- fasteners;
- said control circuit with said at least one conductor wire; and
- a set of installation instructions.

\* \* \* \* \*